United States Patent [19]

Barfield

[11] 3,934,988

[45] Jan. 27, 1976

[54] ALUMINUM SILICATE PARTICLES HAVING A LAYER OF A RARE EARTH OXIDE THEREON

[75] Inventor: Leslie Theodore Barfield, Rotherham, England

[73] Assignee: London & Scandanavian Metallurgical Co., Limited, England

[22] Filed: May 29, 1974

[21] Appl. No.: 474,153

[30] Foreign Application Priority Data
May 30, 1973 United Kingdom............... 25681/73

[52] U.S. Cl. ..................... 51/308; 51/309; 427/215
[51] Int. Cl.². .......................................... B24D 3/34
[58] Field of Search ............ 51/295, 307, 308, 309; 117/100 I; 427/215

[56] References Cited
UNITED STATES PATENTS

| | | | |
|---|---|---|---|
| 2,389,352 | 11/1945 | Fisher | 51/308 |
| 2,744,001 | 5/1956 | Harman et al. | 51/308 |
| 3,573,886 | 4/1971 | Goetzinger et al. | 51/308 |
| 3,768,989 | 10/1973 | Goetzinger et al. | 51/309 |

Primary Examiner—Donald J. Arnold
Attorney, Agent, or Firm—Toren, McGeady and Stanger

[57] ABSTRACT

Polishing powders, for use particularly in the optical industry, are based upon alumina silicate materials, the particles of which are coated with rare earth oxide. The polishing powders are preferably based upon the calcined china clay product known as "Molochite" and are preferably made by precipitating a solution of rare earth compounds, e.g. their sulphates, on to the alumina silicate base material and calcining this material to convert the rare earth compounds into oxides. The polishing powders give excellent results, comparable with the known product based upon a rare and expensive calcium silicate mineral.

5 Claims, No Drawings

ALUMINUM SILICATE PARTICLES HAVING A LAYER OF A RARE EARTH OXIDE THEREON

This invention relates to polishing powders and particularly to such products which include or are based upon rare earth compounds. The polishing powders of the invention are especially useful for polishing glass objects, such as optical lenses and mirrors.

Polishing powders based on rare earths are known and widely used. For instance, in U.S. Pat. No. 3,573,886, there is disclosed a polishing composition comprising a finely-divided rare earth oxide and from 0.1 to 75% by weight of the calcium silicate mineral called wollastonite. In a preferred method, the rare earth is precipitated as a carbonate in a slurry including the wollastonite and is then calcined to form the rare earth oxide. This product is stated to be extremely useful as a polishing composition for glass. The specification further and importantly states that the characteristics of this composition are unique to the use of wollastonite with rare earth compounds.

It is the object of the present invention to provide an improved polishing composition including one or more rare earth compounds. The rare earths are those elements which form the lanthanide series having atomic numbers from 57 to 71 inclusive, as well as elements such as thorium, yttrium and scandium which often occur with the lanthanides.

According to one aspect of this invention, a polishing powder comprises an alumina silicate base material and at least one rare earth oxide.

The invention also consists in a process of preparation of a composition for use as a polishing powder, which comprises precipitating at least one rare earth compound on to a particulate base material comprising an alumina silicate and subjecting the resultant mixture to calcination to convert the rare earth compound(s) into one or more rare earth oxides.

The product of the invention may be regarded as a polishing and smoothing composition comprising an alumina silicate nucleus of the mullite type upon which has been precipitated a rare earth compound. Any suitable method of precipitation may be employed. Preferably, the precipitation step is followed by calcination to convert the precipitated compound to an oxide.

The rare earths normally occur together and with other elements which behave similarly and it is usual for rare earth oxides and compounds to be used as mixtures and not after separation into individual substances. The invention can be carried out by precipitating any one rare earth compound on to Molochite or other mullite-type alumina silicate and converting it into the corresponding rare earth oxide, but in practice the products of the invention usually contain mixtures of rare earth oxides.

The alumina silicate used is preferably the product known as "Molochite" which has been found to be particularly effective. This product is formed by the prolonged calcination of china clay at elevated temperatures, for instance in the range from 1400° to 1600°C. It has a crystalline structure corresponding to mullite, although its ratio of silica to alumina is substantially higher than that required for mullite, the excess silica being in an amorphous form. Other silicate materials which can be used in carrying out the invention include calcined and uncalcined fireclay and fly ash.

The degree of effectiveness of the composition depends upon the amount of rare earth compound precipitated on the Molochite or other alumina silicate material. While it has been found that the use of quite small amounts (5%) of rare earth produces a dramatic effect in improving the polishing performance compared with that of Molochite alone, the polishing performance is improved further though less dramatically by higher levels of rare earth compound. Therefore, a polishing powder according to the invention preferably contains at least 5% by weight of rare earth elements.

The reasons for the effectiveness of Molochite and similar alumina silicates are not fully known, but may be the combination of the well-ordered mullite phase and the amorphous silica phase. The mullite phase should make for particle strength, whereas the silica phase may be the effective nucleant for the rare earth, whose effectiveness as a polishing agent depends upon reactions between the rare earth and the glass systems. It is not known whether higher alumina compounds are suitable but as they tend to be less easily obtained and are more expensive, they are intrinsically less desirable.

In order that the invention may be fully appreciated, the following Examples are given, by way of illustration of the preparation and use of polishing powders according to the invention.

A polishing powder product according to the invention can be produced in general as described below.

A rare earth sulphate solution containing excess sulphuric acid was run into a suspension of − 325 mesh molochite in a heel of water, simultaneously with a caustic soda solution, in such a way as to maintain mildly acid conditions.

The precipitated mixture was decanted free of sodium sulphate and sufficient extra caustic soda solution was added to metathese the resultant basic rare earth sulphate to a rare earth hydroxide, but whilst avoiding adding so much as to hydrolyse the molochite. The mixture of molochite and rare earth hydroxide (which is in effect an oxide) was then decanted and washed free from sodium with water. The slurry was then dried and the product calcined to rare earth oxide at a temperature in the range from 800° to 1000°C and in this instance at approximately 900°C. After sieving to break down agglomerates, the product was then ready for use. The percentage of rare earth oxide in the product was adjusted by altering the proportions of the molochite to the rare earth solution.

The product quality was assessed by measuring the rate of removal of glass from lenses polished under standard conditions.

In the Table below are shown glass removal rates for products according to the invention (Examples 1 to 9) which are then compared with those for similar compounds outside the invention (Examples 10 to 14) in which other nucleants were substituted for the molochite or other alumina silicate material.

This table demonstrates that whereas molochite on its own (Example 16) has a negligible polishing rate, when it is treated by the process above it has a greatly increased glass removal rate, so much so that a compound containing 50% rare earth oxides (Example 2) has a similar glass removal rate to a conventional compound containing 100% rare earth oxides. (Example 15) Similar results can be obtained with products based e.g. on fireclays and fly ash (Examples 7, 8 and 9).

It also can be seen from the table that similar products based on wollastonite (Examples 10, 11 and 12)

give compounds which require a higher rare earth content to give the same glass removal rate as products according to the invention.

Other nucleants of various types (Examples 13, 14) are shown to give still lower glass removal rates and thus the economic advantage of products using molochite as a nucleant is clearly shown.

TABLE

| Example | Base for Precipitation | % Rare Earth Oxide In Product | Rate of Removal of Glass |
|---|---|---|---|
| 1 | Molochite grade 1 | 40 | 0.58 g/hr |
| 2 | Molochite grade 2 | 50 | 0.60 |
| 3 | '' | 35 | 0.56 |
| 4 | '' | 27 | 0.52 |
| 5 | '' | 19 | 0.51 |
| 6 | '' | 9 | 0.43 |
| 7 | Uncalcined fireclay | 40 | 0.53 |
| 8 | Calcined fireclay | 43 | 0.43 |
| 9 | Fly ash | 40 | 0.55 |
| 10 | Wollastonite | 50 | 0.55 |
| 11 | '' | 25 | 0.46 |
| 12 | '' | 17 | 0.37 |
| 13 | Precipitated silica | 60 | 0.39 |
| 14 | Crystalline silica | 41 | 0.48 |
| 15 | — | 100 | 0.65 |

TABLE-continued

| Example | Base for Precipitation | % Rare Earth Oxide In Product | Rate of Removal of Glass |
|---|---|---|---|
| 16 | Molochite grade 2 | 0 | 0.06 |

What is claimed is:

1. A calcined polishing powder comprising an alumina silicate compound of the mullite type, the particles of which have a layer of at least about 5% by weight based on the weight of the composition of a rare earth oxide thereon.

2. The polishing powder of claim 1 wherein the alumina silicate compound is calcined china clay.

3. The polishing powder of claim 2 wherein the alumina silicate compound is molochite.

4. A process of preparation of a composition for use as a polishing powder, which comprises precipitating at least one rare earth compound on to a particulate base material which is an alumina silicate compound of the mullite type and subjecting the resultant mixture to calcination to convert the rare earth compound into one or more rare earth oxides, the amount of the rare earth compound precipitated consting at least about 5% by weight of the total composition.

5. A process according to claim 4 wherein the calcination is carried out at a temperature in the range of 800° to 1000°C.

* * * * *